United States Patent
Sherrill et al.

(10) Patent No.: US 7,082,894 B2
(45) Date of Patent: Aug. 1, 2006

(54) DOG BONE WITH JERKY PIECES

(75) Inventors: Leslie R. Sherrill, Kailua, HI (US); Peter Brett Wheeler, Kailua, HI (US); Laura K. Sherrill, Kailua, HI (US)

(73) Assignee: United Pet Group, Inc., Cincinnati, OH (US)

( * ) Notice: Subject to any disclaimer, the term of this patent is extended or adjusted under 35 U.S.C. 154(b) by 0 days.

(21) Appl. No.: 10/608,223

(22) Filed: Jun. 30, 2003

(65) Prior Publication Data

US 2004/0025803 A1 Feb. 12, 2004

Related U.S. Application Data

(63) Continuation of application No. 09/874,351, filed on Jun. 6, 2001, now Pat. No. 6,584,938.

(51) Int. Cl.
  *A01K 29/00* (2006.01)
(52) U.S. Cl. .................................. 119/709; 119/710
(58) Field of Classification Search ............... 119/709, 119/710, 711, 702, 707; 426/2, 635, 92, 426/574, 576, 641
  See application file for complete search history.

(56) References Cited

U.S. PATENT DOCUMENTS

| | | | | |
|---|---|---|---|---|
| 3,871,334 A | * | 3/1975 | Axelrod ...................... | 119/710 |
| 3,899,607 A | | 8/1975 | Miller et al. | |
| 4,145,447 A | | 3/1979 | Fisher et al. | |
| 4,163,804 A | | 8/1979 | Meyer et al. | |
| 4,229,485 A | * | 10/1980 | Brown et al. ............... | 426/305 |
| 4,260,635 A | | 4/1981 | Fisher | |
| 4,454,164 A | * | 6/1984 | Gellman et al. ............ | 426/549 |
| 4,551,343 A | | 11/1985 | Gellman et al. | |
| 4,692,341 A | * | 9/1987 | Ikeuchi et al. .............. | 426/250 |
| 4,702,929 A | * | 10/1987 | Lehn et al. .................. | 426/635 |
| 4,743,458 A | | 5/1988 | Gellman et al. ............. | 426/549 |
| 4,743,460 A | * | 5/1988 | Gellman et al. ............. | 426/549 |
| 4,800,099 A | * | 1/1989 | Gellman et al. ............. | 426/641 |
| 4,904,495 A | | 2/1990 | Spanier | |

(Continued)

FOREIGN PATENT DOCUMENTS

DE 2115837 A1 12/1972

(Continued)

OTHER PUBLICATIONS

Discount Master Animal Care Catalog, Jan. 1996, pp. 1, 76-78.

(Continued)

*Primary Examiner*—Yvonne R. Abbott
(74) *Attorney, Agent, or Firm*—Banner & Witcoff, Ltd.

(57) ABSTRACT

An animal chew toy for carnivorous animals and a method for making the animal chew toy. The animal chew toy is primarily for dogs, and is safe, entertaining, and satisfies their inherent and instinctive need to chew. The chew toy is particularly safe for older dogs, dogs with weak jaws, and puppies with relatively new teeth. The chew toy is formed into a desired shape from a rawhide bit mixture of rawhide bits or pieces and a bonding agent and/or adherent. A plurality of flavor chunks, for example jerky pieces, are interspersed in the rawhide bit mixture to provide an enticing flavor and aroma that encourages an animal to continue to chew to reveal more flavor chunks. The rawhide bit mixture can further include health affecting additives. One method of forming the chew toy includes extrusion molding which can be coupled with baking or heat-treating to destroy unhealthy pathogens and solidify the chew toy. An elongated jerky member may also be encased within the chew toy.

20 Claims, 5 Drawing Sheets

U.S. PATENT DOCUMENTS

| | | | |
|---|---|---|---|
| 5,021,424 A | 6/1991 | Lawton-Wall | 514/276 |
| 5,200,212 A | 4/1993 | Axelrod | |
| 5,240,720 A | 8/1993 | Axelrod | |
| 5,339,771 A | 8/1994 | Axelrod | |
| 5,456,933 A | 10/1995 | Lee | 426/549 |
| 5,476,069 A | 12/1995 | Axelrod | 119/709 |
| 5,595,142 A * | 1/1997 | Chill | 119/710 |
| 5,635,237 A * | 6/1997 | Greenberg et al. | 426/646 |
| 5,673,653 A | 10/1997 | Sherrill | 119/709 |
| 5,897,893 A | 4/1999 | Mohilef | |
| 6,165,474 A | 12/2000 | Frudakis et al. | 424/195.1 |
| 6,223,693 B1 | 5/2001 | Perlberg et al. | |
| 6,238,715 B1 | 5/2001 | Baikie | |
| 6,277,420 B1 | 8/2001 | Andersen et al. | |
| 6,305,326 B1 | 10/2001 | Suchowski et al. | |
| 6,360,696 B1 | 3/2002 | Arnold et al. | |
| 6,455,083 B1 * | 9/2002 | Wang | 426/104 |
| 2002/0185085 A1 * | 12/2002 | Sherrill et al. | 119/710 |

FOREIGN PATENT DOCUMENTS

| | | |
|---|---|---|
| DE | 3032959 A1 | 3/1982 |
| WO | WO 01/33972 A | 5/2001 |

OTHER PUBLICATIONS

Doctors Foster & Smith's—Catalog Order Form and pp. 38 and 46 from catalog, Sep. 2000.

www.DrsFosterSmith.com, "Jerky Treats," Product Item Nos. 9N-8545, 9N-8546, 9N-8287, Jan. 29, 2001, 2 pages.

* cited by examiner

DOG BONE WITH JERKY PIECES

CROSS REFERENCE TO RELATED APPLICATION

This application is a continuation of U.S. application Ser. No. 09/874,351, filed Jun. 6, 2001, now U.S. Pat. No. 6,584,938, the disclosure of which is hereby incorporated by reference in its entirety.

FIELD OF THE INVENTION

This invention relates to an animal chew toy for carnivorous animals and a method for making the animal chew toy. More particularly, this invention relates to a rawhide animal chew toy primarily for dogs that is safe and entertaining, and that satisfies their instinctive need to chew.

BACKGROUND OF THE INVENTION

Carnivorous animals, primarily dogs, have a basic instinctive urge to chew. Chew toys have been used for many years to channel that instinctive urge to chew in a healthy direction and provide them with exercise for their jaws. "Chew toys" are intended to be chewed by a dog for an extended period of time, and should be distinguished from "treats" which are intended to be chewed by a dog for a relatively short period of time and then digested. Chew toys typically fall within two distinct categories: (i) those consisting of synthetic materials, and (ii) those consisting, at least in part, of animal skin, animal parts or the like. However, as explained below, existing chew toys have various disadvantages making them unsatisfactory in many instances.

Prior chew toys have been manufactured utilizing rubber, polyurethane, latex, nylon, other plastics, and other types of synthetic material. While chew toys consisting of these synthetic materials may be long lasting and resistant to disintegration, they are typically hard, odorless and tasteless. Most dogs do not get excited about these chew toys because of their odorless and tasteless aspects. Accordingly, many dogs will not chew on these toys or will only chew on these toys for short periods of time even when the toy is bone shaped. Further, the synthetic nature of these chew toys makes them difficult and dangerous to digest. Small pieces of these chew toys which tend to break off can potentially cause digestive dangers to the animals. Additionally, these chew toys are generally not biodegradable and are therefore bad for the environment.

Chew toys have also been comprised of portions of deceased animals. Of these types of chew toys, rawhide is a commonly used material. Rawhide chew toys include rolled rawhide sheets, or rolled and knotted rawhide sheets. Rawhide toys are more appealing to dogs and easier to chew and digest than synthetic chew toys. However, many dogs find these rawhide chew toys lacking of substantial flavor and odor. Accordingly, many dogs become bored with these rawhide chew toys and will at most only chew on them for short periods of time.

Some manufacturers have coated or basted the rawhide chew toys with various flavors to provide additional odor or flavor and entice dogs to chew longer. For example, some rawhide chew toys are basted in a hickory-flavored marinade to enhance their flavor and odor. Other rawhide chew toys have been coated in a cheese-flavored substance. However, these basted and coated chew toys are disadvantageous for many pet owners as they can stain carpets and other items in a home. Further, these coated and basted chew toys are undesirable for many pet owners because they become malodorous to humans.

Chew toys have also been formed of rawhide pieces. These chew toys are sometimes referred to as "munchies." One method of making a chew toy is disclosed in U.S. Pat. No. 5,476,069 to Axelrod. Axelrod discloses rawhide comminuted or chopped into small particles. The rawhide particles can be mixed with casein and gelatin to facilitate molding, and other additives may be added as an attempt to make the chew toy more nutritious and attractive to a dog. The mixture is then molded into a variety of shapes including bone shaped. One problem with the chew toy of Axelrod, is that it does not effectively entice and capture a dog's curiosity for a long period of time. This problem occurs because any attractiveness additive is dispersed throughout the molded chew toy such that further chewing does not reveal further benefit.

The munchy disclosed in U.S. Pat. No. 4,702,929 to Lehn et al., suffers from a similar problem. In Lehn et al., a mixture of ground rawhide, starch and flavoring additive is extruded to form an elongate munchy. The flavoring additive can be fishmeal or synthetic flavoring such as chicken, chocolate or beef flavor, and is dispersed throughout the mixture. However, a dog's natural curiosity is not aroused since further chewing does not increase the flavor or aroma, nor does further chewing visually reveal anything new. Similar, to Axelrod's chew toy, the munchy of Lehn et al. does not capture a dog's curiosity for a long period of time.

Natural bones that have hard exteriors and bone marrow in an inside cavity can capture a dog's attention. A dog will spend a lot of time biting and licking a natural bone attempting to extract all of the marrow from an inside cavity of the bone. The interior marrow creates a visual and olfactory puzzle that a dog will spend hours trying to solve; that is, how to get the marrow out. The problem is that there are several hazards to natural bones. First, natural bones can carry bacterial or other pathological diseases that can be harmful to dogs and humans. Second, natural bones can fracture into shards that are dangerous for a dog to swallow. Third, natural bones are too hard for mature healthy dogs to safely chew, and even more so for puppies with new teeth, dogs that have weak or injured jaws, and older dogs to safely chew. Fourth, natural bones have fatty oils that can stain and damage household carpeting and other items in a home, still further the smell can be too strong for inside of a home.

U.S. Pat. No. 5,673,653 to Sherrill discloses a chew toy for animals, including a jerky member wrapped in a rawhide sheet member. However, rawhide sheet members also can be hard and therefore difficult to chew for puppies, older dogs, and dogs that have weak or injured jaws.

Accordingly, a chew toy that overcomes the problems and disadvantages of the prior art is thus needed.

SUMMARY OF THE INVENTION

It is an objective of the present invention to create a chew toy for carnivorous animals, e.g., domestic dogs, which overcomes the drawbacks of existing chew toys.

It is an objective of the present invention to provide a chew toy made of rawhide bits which entices a dog's curiosity and enhances a dog's desire to chew for extended periods of time.

It is an objective of the present invention to combine the individual advantages of jerky and rawhide bits in a single chew toy to provide a improved chew toy, which satisfies a dog's curiosity and instinctive urge to chew.

Another objective of the present invention is to provide a chew toy, which is biodegradable and safely ingested by dogs.

It is another objective of the present invention to provide a chew toy that is safe for older dogs, dogs with weak jaws, and young dogs with relatively new teeth.

It is yet another objective of the present invention to provide a chew toy for dogs, which need not be coated or basted with flavor and thus does not stain carpets or household articles.

It is an objective to recycle rawhide off-cuts and tailings from rawhide products or rawhide product manufacturing for use in chew toys of the present invention.

It is an objective of the present invention to provide a chew toy with a high content of rawhide bits tending to reduce tartar on the teeth of the dogs chewing the toy.

In one aspect of the present invention, a chew toy for domestic carnivorous animals is comprised of rawhide bits mixed with a bonding agent and/or adherent to form a homogenous composite or granulate rawhide paste, and a distinct flavor part.

In a further aspect, the chew toy of the present invention includes a homogenous composite or granulate rawhide paste encompassing or encasing a flavor member that provides an enticing flavor and aroma.

In yet a further aspect, the flavor member is elongate and can extend in a wick like or cantilever manner from the granulate rawhide paste or homogenous composite. The flavor member can be a slice of meat, fillet of meat, bacon or the like, and/or more preferably jerky.

In yet another aspect of the present invention, a chew toy for carnivorous animals includes rawhide bits and a bonding agent and/or adherent, which is interspersed with flavor chunks. The flavor chunks can be chunks of meat, chunks of bacon or fillet, or more preferably chunks of jerky.

In a further aspect of the present invention, a chew toy includes granulate rawhide paste or homogenous composite having interspersed flavor chunks in an elongate flavor member.

In yet another aspect of the present invention, the chew toy includes coloring, flavor, vitamins, minerals, and/or other health affecting matter.

In a another aspect of the present invention, the chew toy has a high gelatinous content for providing a flexible and rubbery like chew toy that is deformable into knots for example and softer to chew in comparison to high rawhide content chew toys.

In another aspect of the present invention, the flavor member and/or flavor chunks have textures that serve to frictionally hold them within the granulate rawhide paste and/or homogenous composite, which may also have a texture for frictionally engaging the flavor member or chunks.

In yet another aspect, the present invention provides a method of forming a chew toy for carnivorous animals. The method includes the steps of providing bits of rawhide, mixing the bits of rawhide with a bonding agent and/or adherent, providing an flavor member, and forming the rawhide mixture (referred to above as a "granulate rawhide paste" or "homogenous composite") around the flavor member.

A further aspect of the method of forming a chew toy includes placing the flavor member so that a portion extends freely exterior the rawhide bit mixture. In yet another step, the providing a flavor member step includes providing an elongate flavor member.

In another aspect of the method of forming a chew toy, the forming of the rawhide mixture includes filling a first mold half, filling a second mold half, placing the flavor member on one of the filled mold halves, compressing the mold halves together thereby sandwiching the flavor member, and then baking or otherwise drying.

In another aspect, the present invention includes another method of forming a chew toy for animals. The method includes the steps of providing bits of rawhide, mixing the bits of rawhide with a bonding agent and/or adherent to form a rawhide bit mixture, interspersing a plurality of flavor chunks and forming the mixture into a shaped chew toy.

In a further aspect, the present invention includes the method step extruding the rawhide bit mixture with interspersed flavor chunks into the shaped chew toy.

In a further aspect, another method step for forming the chew toy includes providing an elongate flavor member, encasing or encompassing the elongate flavor member with the rawhide bit mixture and interspersed flavor chunks. In a further aspect, the elongate flavor member is positioned so that a portion of the elongate flavor member extends freely in a wick-like or cantilever manner.

DETAILED DESCRIPTION OF THE PREFERRED EMBODIMENT

Figure 5:
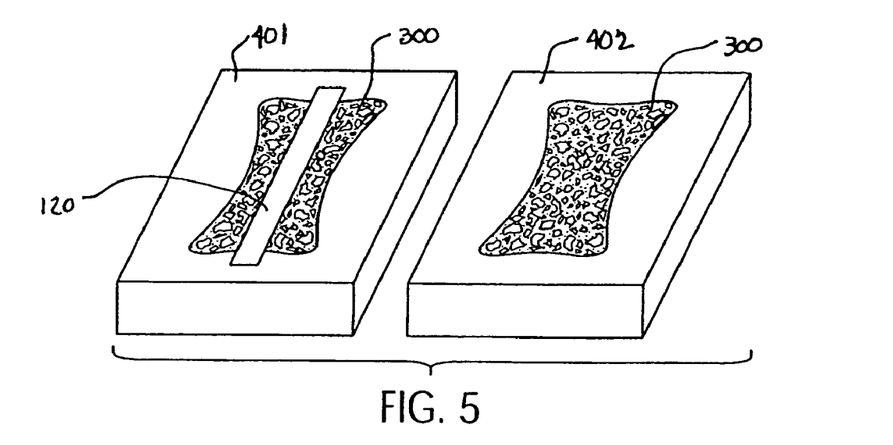
FIG. 5 is a perspective view of the two mold halves of FIG. 4 filled with rawhide mixture and an elongate flavor member placed on one mold half.
Figure 6:
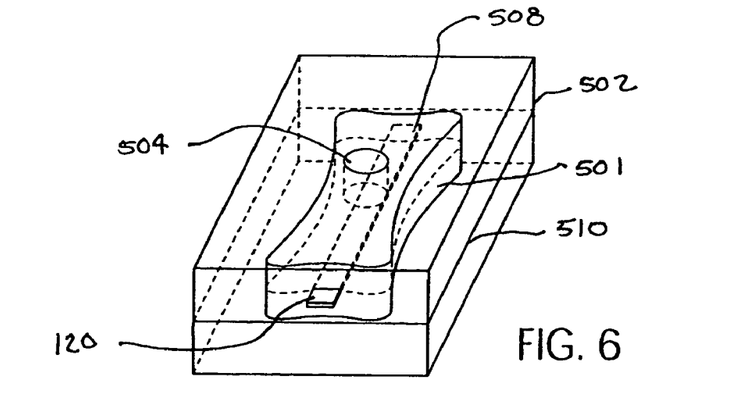
FIG. 6 is a perspective view of a mold having an elongate flavor member disposed through a central cavity.
Figure 7:
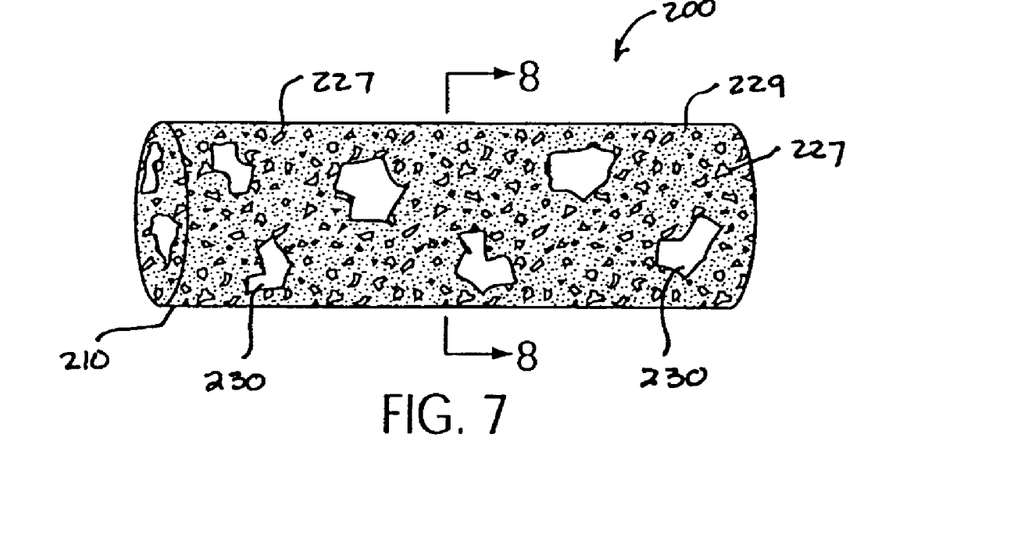
FIG. 7 is a top perspective view of another embodiment of a chew toy of the present invention including interspersed flavor chunks.
Figure 8:
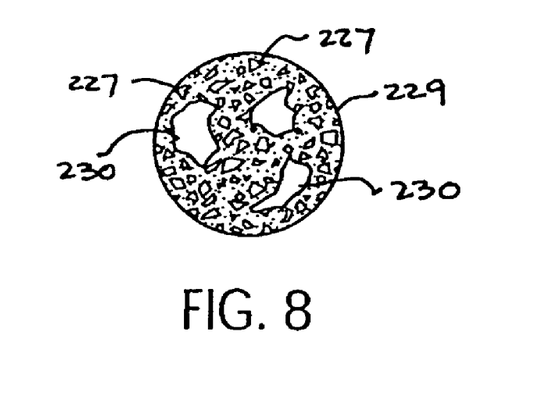
FIG. 8 is a cross-sectional view taken along the line 8—8 of FIG. 7.
Figure 9:
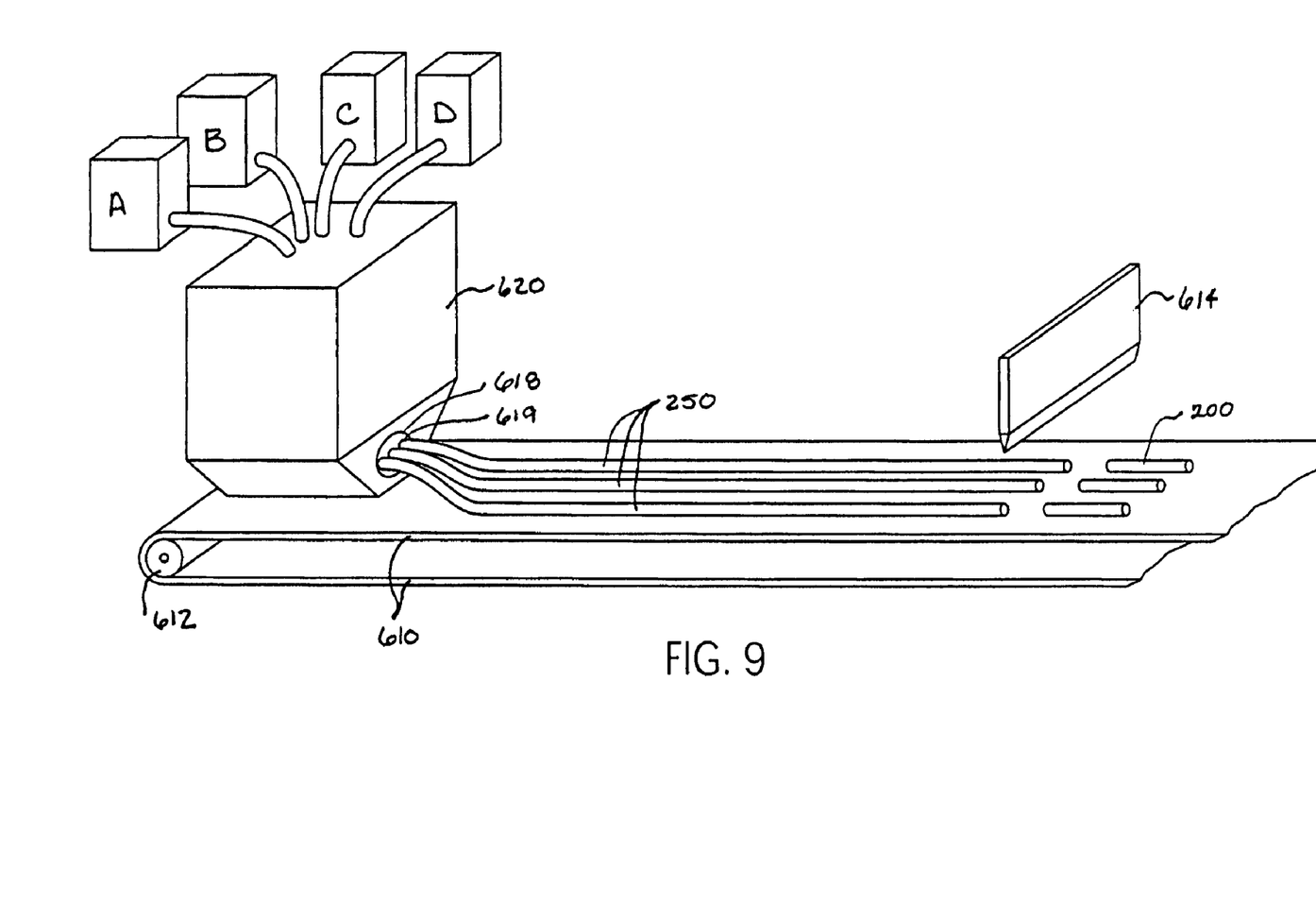
FIG. 9 is a perspective view of schematic diagram of an extruder for mixing and forming chew toys; and, FIG. 10 is a perspective view of yet another embodiment of a chew toy of the present invention including an elongate flavor member and interspersed flavor chunks.
Figure 10:
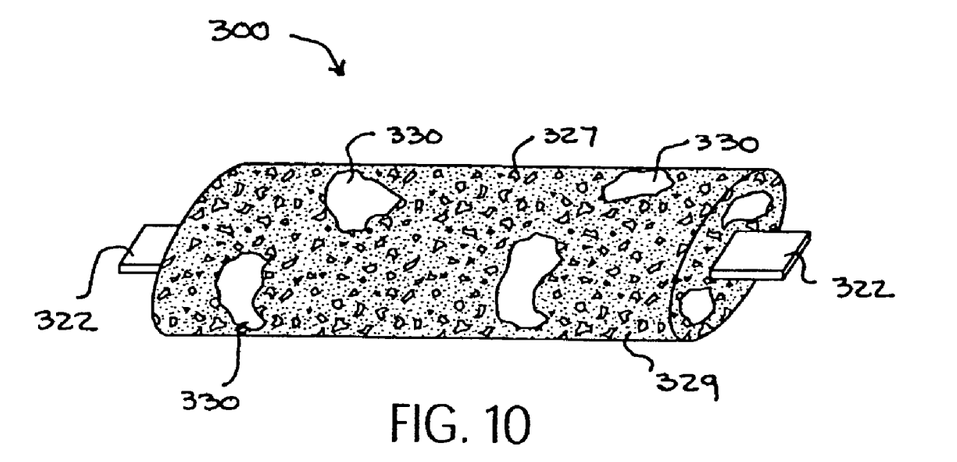

Referring now to the drawing, the present invention chew toy for carnivorous animals, e.g., domestic dogs, and method for making are illustrated in FIGS. 1–6. The chew toy is designated generally by reference numeral 100 in FIG. 1. A first method of making the inventive chew toy is described in conjunction with FIGS. 4 and 5. An alternative method of making the inventive chew toy is described in conjunction with FIG. 6. Alternative chew toy embodiments are shown in FIGS. 7–8 and 10, and an alternative method of making a chew toy is schematically illustrated in FIG. 9.

In each of the embodiments herein, the article of the subject invention is referred to as a "chew toy." The most common use of the present article is a toy, though it can also be a therapeutic device, a medicinal conveyance device, or a dental hygiene device for example, thus the term "toy" is not intended to limit the present article which may simply be referred to as a "chew."

Further, in each embodiment described herein, the chew or chew toy comprises a rawhide composition and one or more flavor pieces. The term "rawhide" generally refers to cattle hides, however, for purposes of this invention "rawhide" includes the skin of all types of animals, including but not limited to, cleft foot animals, hoofed animals, bovine, livestock, buffalo, pigs, poultry, and suitable aquatic animals or fish. The rawhide need not be explicitly 'raw' and may have some treatment not deleterious to carnivorous animals, particularly dogs.

The distinct flavor piece or pieces may be either a flavor member or flavor chunks and is most preferably, but not limited, jerky. Jerky is an extremely appetizing treat for dogs, and the taste of the jerky constantly entices dogs to chew the toy. It should be noted that the term "jerky" as used herein is defined as including, but not limited to, "traditional jerky" and "kippered jerky." "Traditional jerky" as defined herein typically consists of beef, lamb, pork, fish, poultry including chicken and turkey, and/or any other animal flesh, which is cut into strips. The strips of meat may be flavored using spices and/or marinade, and dried via a smoker or another manner. "Kippered jerky" as defined herein includes pieces of meat, such as, beef, lamb, pork, fish, poultry including chicken and turkey, and/or any other animal meat, which is mixed together with spices and/or fillers. The mixture is forced through a sausage press (with or without a casing) and is typically formed flat rather than cylindrical. The flat product may then be smoke dried and/or dried in another manner.

Figure 1:
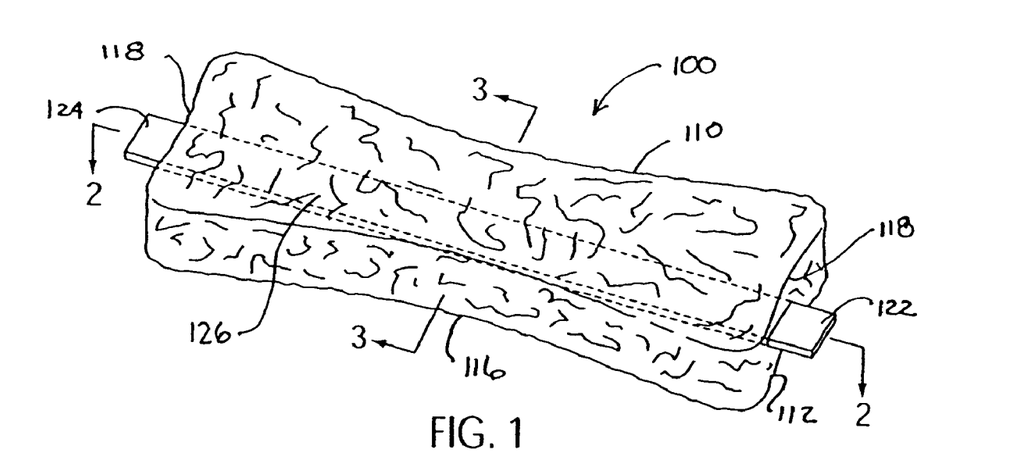
FIG. 1 is a top perspective view of a chew toy of the present invention including an elongate flavor member.

As shown in FIG. 1, one preferred shape of the chew toy takes a form of a bone shape. In such a configuration, a chew toy 100 preferably has a first end portion 112 and an opposed second end portion 114. In between the end portions 112 and 114 is a center or middle portion 116. The middle portion 116 may be narrower in cross-sectional area than the end portions 112 and 114. The end portions 112 and 114 can include indentations 118. These features, in combination with its elongated proportions, may assist the chew toy 100 in simulating the bone shape.

The chew toy 100 preferably includes a body 110 and a flavor member 120. The flavor member 120 is preferably an elongate member. The elongate flavor member 120 is at least partially contained within the body 110. In one arrangement, as shown, the elongate flavor member 120 has an interior portion 126 that is encased within the body 110. The elongate flavor member 120 also has opposed end portions 122 and 124. The end portions 122 and 124 preferably extend outwardly from the body 110 at one or both ends and may be supported by the body 110 in a wick like or cantilever manner. The interior portion 126 extends from one end of the body to another and forms a chew trail through the body 110.

The body 110 of the present invention is preferably comprised of a granulate rawhide paste. "Granulate rawhide" generally refers to rawhide that is cut or ground in to bits or pieces 127. The rawhide pieces 127 can be processed with a bonding agent or adherent 129. Preferably, the granulate rawhide is mixed with the bonding agent or adherent 129, although the rawhide can be combined with bonding agent or adherent prior to cutting, grinding or granulating the rawhide into bits and pieces.

The bonding agent or adherent 129, hereafter simply referred to as adherent, is preferably a natural ingredient that is digestible and soluble, such as Amylum (e.g., Merck Amylum soluble), gelatin, starch glue and/or an animal hoof composition. However, other adherents may be used in lieu of, or in addition to, those described.

The granulate rawhide 127 with adherent 129 is referred to as a "rawhide mixture", "homogenous composite" and/or "granulate rawhide paste." The latter two terms referring to a liquid or a solid phase. In either phase, the homogenous composite or granulate rawhide paste is formed into the desired chew toy shape. The rawhide mixture may include additives, such as coloring, flavor, vitamins, minerals, nutrients, or any other health affecting matter such as the ingredients as described hereinafter.

It is noted that the term "homogenous" as used herein means having a generally uniform structure or composition throughout. A chew toy having a homogenous composite of granulate rawhide 127 with adherent 129 is preferred, but other structures are contemplated as part of the present invention. Homogenous also includes an arrangement wherein the distributed rawhide bits may settle-out of the rawhide bit paste making the rawhide bits significantly more or less dense in certain sections of the chew toy, and/or when layers of granulate rawhide pastes having differing sized bits are used to form a chew toy.

It will be appreciated that shapes other than bone shapes are contemplated. For example, the chew toy can be spherical, elliptical, cylindrical, rectangular, square, or any desired shape or cross-section. It is appreciated that a bone shape may be preferred by customers purchasing a chew toy since it is most readily identified as a bone for dogs.

In use, a carnivorous animal, particularly a domestic dog, will take an initial interest in the chew toy 100 of the present invention because of the exposed exterior flavor member, end portions 122 and 124. These exterior flavor member end portions 122 and 124 attract a dog visually and by unencumbered scent. Having first identified the source of the desirable scent as being the end portions, a dog may initially chew these portions until the dog discovers that the flavor member extends further into the interior the body. The dog must then find a solution for extracting more of the flavor member from inside of the body. Because of the texture of the granulate rawhide and/or adherent in rawhide body 110, the dog cannot simply pull out the flavor member 120 and leave the remaining rawhide body 110 behind. In this manner, the chew toy will occupy the dog for a long period of time as the dog chews on the body portion dissolving and breaking off bits of rawhide until additional portions of the flavor member can be reached.

With respect to the flavor member 120, it is most preferably jerky, which is defined above. The flavor member 120 need not be 'cut' into strips, rather the strips could be pulled from the meat, separated along natural grain lines of the meat, or otherwise made into strips. The flavor member 120 need not be dried, as in a conventional jerky process. Rather, undried meat can be simply treated with a preservative (e.g., sodium benzoate). Preservative can also be used with dried jerky.

To manufacture the chew toy 100 of the present invention, rawhide is cut or ground into bits or small pieces 127 of a predetermined size. The preferred average size of the rawhide pieces 127 are less than about 50 mm$^2$, preferably between about 10 and 40 mm$^2$, and still more preferably about 36 mm$^2$. However, the size is dependent on a plurality of factors including the desired appearance of the body, the optimum texture and adherence to the flavor member 120, the ability of the bits 127 to adhere to each other, and the source of rawhide available. The overall proportion of the rawhide bits or pieces to the flavor member, by volume and/or by weight, is preferably, but not necessarily, about 5:1 to 15:1, and more preferably about 10:1.

The source of rawhide that is used to make the present chew toy can be the recycled off-cuts from other rawhide products. For example, off-cuts, tailings and other rawhide wastes from making other rawhide type chew toys are particularly suitable. The off-cuts can be cut or ground into the desired size of pieces or bits.

Rawhide bits 127 are combined with a binder or adherent 129 and formed into the desired shape that encases or encompasses the elongate flavor member 120. In the preferred method, rawhide bits 127 are mixed with adherent 129 (e.g., starch) to form a rawhide mixture, granulate rawhide paste, and/or homogenous composite. This mixture is then formed into layers, molded, or extruded.

In one example of a molding type method, molds halves 401 and 402 represent mating portions of a bone shaped mold. See FIG. 4. The mold halves 401 and 402 contain, respectively, product forming cavities 404 and 406. The cavities 404 and 406 of the mold halves 401 and 402 may be filled with the rawhide mixture or granulate rawhide paste 300 thereby forming two layers. For example, an upper layer and a lower layer. An elongate flavor member 120 is placed on one layer, as shown in FIG. 5. The elongate flavor member 120 can be pre-dipped in adherent, such as the aforementioned starch. Further, one or both of the layers can be coated with adherent. The layers are then compressed together bonding the halves together and bonding to the flavor member 120. A recess 408 can be formed in one or both of the mold halves for receipt of end portions 122 and 124 of the flavor member. Recesses 408 prevent the freely extending end portions of flavor member 120 from being unduly flattened during layer compression, and may assist in the accurate placement of the flavor member 120.

The molded product is then baked or otherwise dried. Raising the temperature of the rawhide mixture and/or jerky serves to solidify the chew toy and has a further benefit of killing unwanted bacteria, germs, microbes, and pathogens. Particularly, drying the chew toy in a temperature of at least 75 degrees Celsius (167 degrees Fahrenheit) is known to kill salmonella. The chew toy can be heated at about 60 to 100 degrees Celsius (140 to 212 degrees Fahrenheit) for a duration of about 0 to 48 hours, generally about twelve hours. Alternatively, the chew toy can be heated at a low temperature of about 50 to 70 degrees Celsius (122 to 158 degrees Fahrenheit) for about 1 to 4 hours to physically affect the composition of the chew, and at a higher temperature of 75 to 95 degrees Celsius (167 to 203 degrees Fahrenheit) for about 0 to 3 hours to chemically affect the composition of the chew. The temperature and time may vary depending on the size of the chew toy and type of heat administered.

In an alternative method of making the chew toy, a mold cavity 501 is provided for injection molding. A mold cavity 501 is formed in mold 502. Mold 502 includes at least one port 504 for injecting granulate rawhide paste into cavity 501. Mold 502 further includes a region 508 for receipt of flavor member 120 prior to injecting the granulate paste into cavity 502. Mold 502 maybe split into two parts along line 510 for removal of the formed chew toy. The chew toy may be baked or otherwise dried before or after removal to thereby solidify the granulate rawhide paste. The chew toy is preferably air packed and/or shrink-wrapped to prevent the flavor member from spoiling.

Since chewing rawhide products for extended periods of time tends to reduce plaque and tartar on dogs' teeth, the chew toy of the present invention can provide enhanced reduction of plaque and tartar because dogs will tend to gnaw on the present chew toy for longer periods of time.

Most preferably, the chew toy is void of synthetic material. Rawhide and jerky are used because of their biodegradably, ease of digestion by dogs, and attracting to dogs. The chew toy of the present invention is thus environmentally friendly and easier to digest than chew toys that include synthetic materials. Further, since the rawhide is cut or ground into bits or pieces, the chew toy is more suitable for older dogs, dogs with weak or injured jaw, and for young dogs with new teeth.

In an alternative embodiment, not shown, the flavor member 120 may have an accentuated texture or protrusion, or may be cut to provide notches or serrations at its periphery to enhance the holding force between the flavor member 120 and the body 110.

FIG. 7 shows another embodiment of the present invention, wherein a chew toy 200 for domestic carnivorous animals is provided with interspersed flavor chunks or pieces 230. Chew toy 200 comprises bits of rawhide 227 mixed with a bonding agent and/or adherent 229 to form a granulate rawhide mixture as described above. However, in this arrangement, the granulate rawhide mixture is interspersed with flavor chunks 230 as generally illustrated in FIGS. 7 and 8. The flavor chunks are scattered through the chew toy to entice a dog or other carnivorous animal to continue chewing to satisfy their sense of taste and smell with additional flavor chunks. This provides an arrangement where each bite enables the dog to taste discrete treat pieces and/or enables the dog to be exposed to a fresh jerky or other desirable scent.

The flavor chunks can be chunks of meat or jerky (as above), or chunks of like flavor product, such as, bacon or fillet. Natural meat and/or jerky is desirable because natural products are thought to be healthful, however, synthetically flavored chunks are contemplated. The size of the chunks can be about one to thirty times the size of the rawhide bits.

FIG. 9 schematically illustrates a method of making chew toy 200. The method includes providing an extruding apparatus 600 having a conveyor belt 610 that advances via conveyor roller 612. Conveyor belt 610 conveys one or more continuous extruded products 250 toward a cutting knife 614. Cutting knife 614 vertically descends to conveyor belt 610 for cutting the continuous extruded product 250 into a desired length of chew toy 200. A hopper 620 is provided for containing and mixing the elements of the chew toy into a paste prior to extruding the paste through orifice plate 618. Orifice plate 618 has one or more orifices 619. Orifices 619 may be round, square, rectangular, polygonal, elliptical or any other desired shape.

The chew toy ingredients are schematically illustrated at elements A, B, C, and D. By way of example, rawhide bits A and adherent B are fed into hopper 620. Flavor chunks C are also added to the hopper and mixed to intersperse in elements A and B. Element D is one or more additional ingredients that are discussed later in greater detail.

Hopper 620 serves to contain and mix elements A, B, C, and D until ready for extruding. A means of compressing the mixed elements, such as helical screw or piston (neither shown), can be provided in the hopper for advancing the mixed elements toward and through orifices 619. Any suitable mixing arrangement may be used.

Element D generally represents one or more additional ingredients, such as, vitamins (e.g., vitamin C), minerals, glycerin (a sweetener), seaweed, algae (e.g., Spirulina), wheat germ (a coat improving additive), glucosamine, antioxidants, medicine and/or other health affecting matter.

Figure 2:
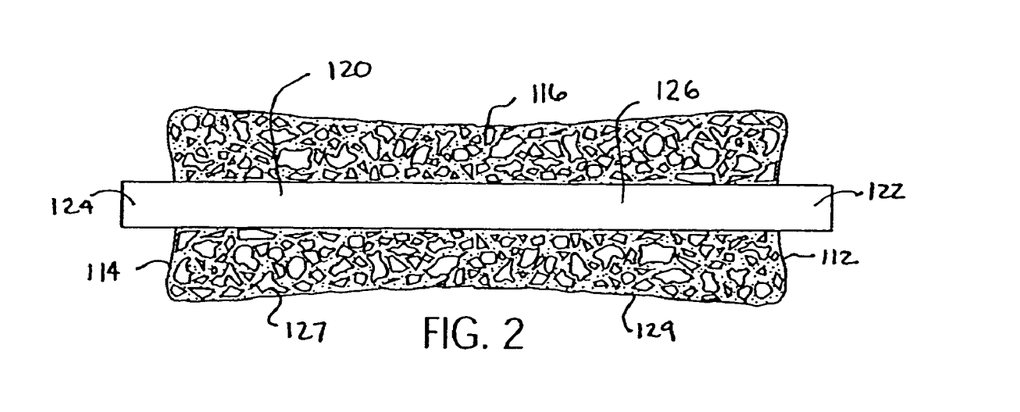
FIG. 2 is a cross-sectional view taken along the line 2—2 of FIG. 1.
Figure 3:
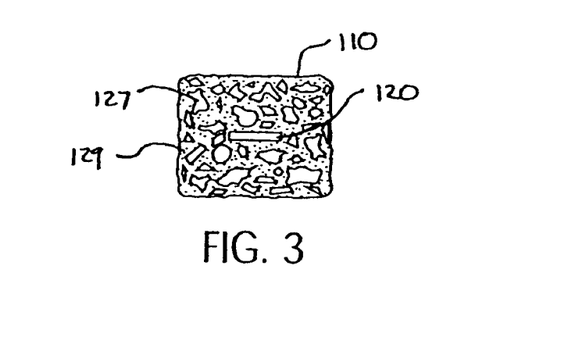
FIG. 3 is a cross-sectional view taken through line 3—3 of FIG. 1.
Figure 4:
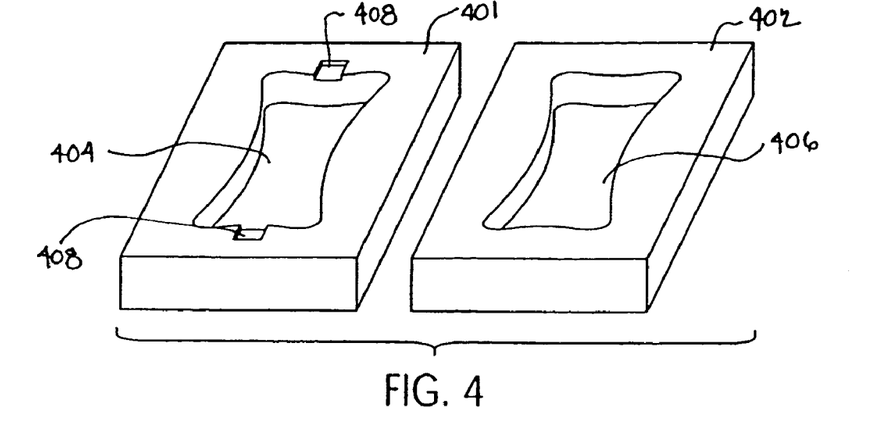
FIG. 4 is a perspective view of two empty mold halves for the method of forming the present invention.

These additional ingredients may also be incorporated into the mixtures for the embodiment of FIGS. 1–3. The chew toy of the present invention may serve as a vehicle for administering certain health affecting matter, particularly medicines, in the rawhide mixture or in the flavor member or flavor chunks.

Additionally, in an alternative arrangement, a high gelatinous content may be provided, which tends to make the chew toy more flexible and rubber-like. The high gelatinous content is also softer and easier to chew than harder high content rawhide chew toys. A soft, flexible chew toy may include about fifteen percent or more gelatinous material, preferably about fifteen to twenty percent (by weight). The resulting flexible and rubbery like properties of the chew lends the chew toy to being tied into various shapes after extrusion forming, for example.

As in the first embodiment, the textures of the flavor chunks and/or rawhide bit mixture may serve to frictionally hold the flavor chunks within the body of the chew toy. The textures aid in preventing an animal from pulling the flavor chunks from the chew toy without actually chewing the toy for an extended period of time.

FIG. 10 shows a further embodiment wherein a chew toy 300 includes both an elongate flavor member 322 and interspersed flavor chunks 330, both as previously described. Again, the chew toy is generally formed of rawhide bits 327 mixed with a bonding agent and/or adherent 329, however, here flavor chunks or pieces 330 as described above are added. Chew toy 300 may include additional ingredients like those discussed above, including altering the hardness by more or less gelatinous content.

Elongate flavor member 322 is encased or encompassed in the rawhide bits and flavor chunks mixture. The elongate member may also extend freely exterior the rawhide bit mixture, which has interspersed flavor chunks, in a cantilever or wick like manner as described above. The elongate flavor member 322 provides an enticing, flavorful and aromatic, part that intrigues and encourages a dog to continue chewing to reveal from the granulate rawhide paste further flavor and aroma by exposing more of the elongate member. Interspersed flavor chunks 330 similarly entice a dog to continue chewing to reveal additional flavor chunks that taste and smell appealing. The flavor of the chunks or pieces can be uniform or vary within a single chew (e.g., chicken chunks and beef chunks), and can be the same flavor as the elongate flavor member or different.

The composite can include, by weight, about 50% to 95% rawhide bits (more preferably at least 60% rawhide bits) and about 5% to 50% gelatin (more preferably 15% to 20% gelatin). If desired, one arrangement also includes about 5% to 10% of an additive such as wheat germ, about 5% to 10% fat, and about 0 to 10% glycerin (more preferably 5% glycerin).

While particular embodiments of the invention have been shown and described, it is recognized that various modifications thereof will occur to those skilled in the art. For example, it is possible to make the chew toy of the present invention in any desired shape, including configurations other than a bone shape, cylindrical shaped, or oval cross-sectionally shaped, as illustrated in the drawing figures. Therefore, the scope of the herein-described invention shall be limited solely by the claims appended hereto.

What is claimed is:

1. An animal chew, comprising:
   a composite of animal hide bits, adherent, and pieces of jerky interspersed in the composite and discrete from the animal hide bits, wherein the animal hide bits make up at least 60% of a weight of the composite.

2. The animal chew of claim 1, wherein the jerky is in the form of a chunks.

3. The animal chew of clam 1 further including a health affecting additive.

4. The animal chew of claim 1, having a gelatin content of about fifteen percent by weight.

5. The animal chew of claim 1, wherein the average size of the discrete jerky pieces is one to thirty times the average size of the animal hide bits.

6. The animal chew of claim 1, wherein the animal hide bits include small pieces of rawhide.

7. The animal chew of claim 1, wherein the pieces of jerky are discrete, spaced chunks.

8. An animal chew, comprising a plurality of discrete, spaced, meat pieces within a solidified animal hide granulate paste, wherein the animal chew comprises, by weight, about 50 to 95 percent rawhide bits and about 5 to 50 percent gelatin.

9. The animal chew of claim 8 wherein the solidified animal hide granulate paste is cylindrical shaped.

10. The animal chew of claim 8, wherein the composite further comprises, by weight, about 5 to 10 percent wheat germ, about 5 to 10 percent fat, and about 0 to 10 percent glycerin.

11. The animal chew of claim 8, wherein the discrete, spaced meat pieces are discrete, spaced pieces of jerky.

12. The animal chew of claim 8, wherein the animal chew comprises, by weight, at least 60 percent rawhide bits.

13. The animal chew of claim 8, wherein the animal chew comprises, by weight, 15 to 20 percent gelatin.

14. The animal chew of claim 8, wherein the animal chew comprises, by weight, at least 60 percent rawhide bits and 15 to 20 percent gelatin.

15. The animal chew of claim 8, wherein the animal chew comprises, by weight, about 5 to 10 percent fat and about 0 to 10 percent glycerin.

16. An animal chew, comprising: a body having a plurality of bound animal hide bits; and a plurality of jerky pieces discrete from the plurality of animal hide bits.

17. The animal chew of claim 16, wherein the body of the chew includes a visible exterior surface and an interior, and where some of the jerky pieces are located on the visible exterior surface and other jerky pieces are located in the interior and not on the visible exterior surface.

18. The animal chew of claim 16, wherein the average size of the jerky pieces is one to thirty times the average size of the animal hide bits.

19. The animal chew of claim 18, further comprising adherent for binding the plurality of animal hide bits, and a health affecting additive.

20. An animal chew, comprising a plurality of discrete, spaced, meat pieces within a solidified animal hide granulate paste, wherein the animal chew has a weight that is at least 60% from animal hide.

* * * * *